United States Patent
Paterson et al.

(10) Patent No.: US 11,144,715 B2
(45) Date of Patent: Oct. 12, 2021

(54) EFFICIENT DATA ENTRY SYSTEM FOR ELECTRONIC FORMS

(71) Applicant: ProntoForms Inc., Ottawa (CA)

(72) Inventors: Christopher James Herbert Paterson, Ottawa (CA); Gemunu Prasanna Kapila Bandara Ekanayake, Kanata (CA); Glenn Michael Chenier, Kanata (CA)

(73) Assignee: ProntoForms Inc., Ottawa (CA)

( * ) Notice: Subject to any disclaimer, the term of this patent is extended or adjusted under 35 U.S.C. 154(b) by 0 days.

(21) Appl. No.: 16/205,148

(22) Filed: Nov. 29, 2018

(65) Prior Publication Data

US 2020/0175100 A1    Jun. 4, 2020

(51) Int. Cl.
*G06F 40/174* (2020.01)
*G06K 9/46* (2006.01)

(52) U.S. Cl.
CPC ............. *G06F 40/174* (2020.01); *G06K 9/46* (2013.01); *G06K 2209/01* (2013.01)

(58) Field of Classification Search
CPC ..... G06F 17/24; G06F 3/04842; G06F 17/243
See application file for complete search history.

(56) References Cited

U.S. PATENT DOCUMENTS

| | | | |
|---|---|---|---|
| 8,948,490 B1* | 2/2015 | Jones | G06Q 20/042 |
| | | | 382/135 |
| 9,582,913 B1* | 2/2017 | Kraft | G06K 9/00577 |
| 2004/0181749 A1* | 9/2004 | Chellapilla | G06K 9/00449 |
| | | | 715/222 |
| 2008/0267505 A1* | 10/2008 | Dabet | G06F 40/174 |
| | | | 382/181 |
| 2012/0163664 A1* | 6/2012 | Zhu | G06K 9/72 |
| | | | 382/103 |
| 2013/0212190 A1* | 8/2013 | Patil | G06N 5/04 |
| | | | 709/206 |
| 2014/0297331 A1* | 10/2014 | Vazquez | G16H 10/60 |
| | | | 705/3 |
| 2015/0078671 A1* | 3/2015 | van Deventer | G06K 9/00449 |
| | | | 382/217 |
| 2016/0217119 A1* | 7/2016 | Dakin | G06F 40/274 |
| 2016/0275346 A1* | 9/2016 | Liu | G06Q 10/109 |
| 2017/0357627 A1* | 12/2017 | Peterson | G06F 7/023 |
| 2018/0033211 A1* | 2/2018 | Berman | H04N 13/344 |
| 2019/0034894 A1* | 1/2019 | Walia | G06Q 20/3276 |
| 2021/0004584 A1* | 1/2021 | Bildner | G06K 9/6256 |

* cited by examiner

*Primary Examiner* — Scott T Baderman
*Assistant Examiner* — Mario M Velez-Lopez
(74) *Attorney, Agent, or Firm* — Stratford Group Ltd.

(57) ABSTRACT

A method for efficient data entry in a field of an electronic form displayed on a mobile device screen is disclosed. The method comprises a user selecting a camera function using a camera selector and taking a picture of information. Selectable text is extracted from the picture and displayed in a data entry screen where the form is displayed. The user selects a one or more elements from the selectable text; and the selected elements are inserted into the field.

12 Claims, 7 Drawing Sheets

EFFICIENT DATA ENTRY SYSTEM FOR ELECTRONIC FORMS

BACKGROUND

Electronic forms are very useful tools to enter data directly into a database. They are used pervasively in all industries, for example repair industry, transport etc. . . . . Smart phones, tablets offer capabilities of filling online forms anywhere using an on-screen software-based keyboard that pops up when a field in the form is touched. The user then enters the text letter by letter (or number) which is time consuming and error prone. It would be desirable to speed up the data entry for forms.

SUMMARY

In accordance with an embodiment, a method for efficient data entry in a field of an electronic form displayed on a mobile device screen. The method comprises a user selecting a camera function using a camera selector and taking a picture of information; selectable text is extracted from the picture and displayed in a data entry screen coupled to said form. The user selects a one or more elements from said selectable text; and the selected elements are inserted into the field.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
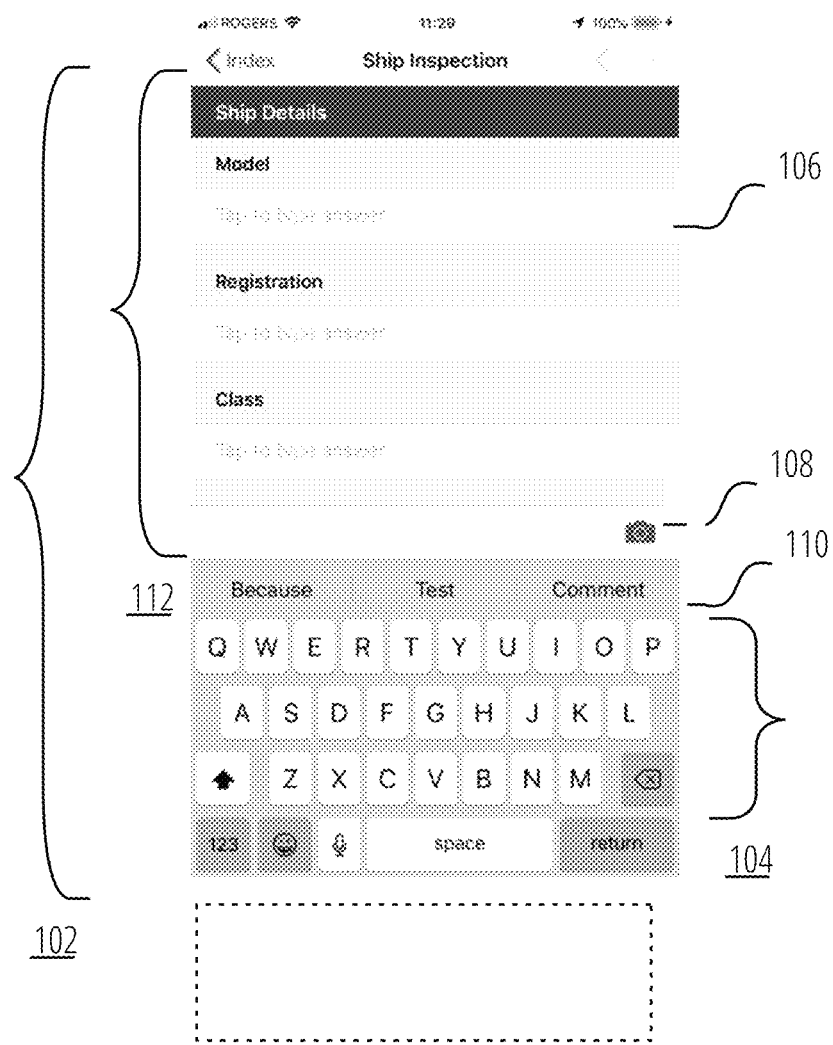
FIG. 1 illustrates a mobile device screen with a form

FIG. 1 depicts a form 112 displayed on a mobile device screen 102. When the user taps on a field, a standard soft data entry screen 104 appears, initially with a soft keyboard and Auto fill 110 buttons. The Auto fill 110 function displays common words from the dictionary that match the letters entered. The user can select the right word when displayed to avoid typing the rest of the word. However, when filling forms, a lot of data entry involves text and numbers that are not part of the dictionary (e.g. client name, serial number, manufacturer name etc. . . . ). In one embodiment, the user can use the camera selector 108 to enable the mobile device camera mode in order to take a picture of some Information 202 to enter.

Figure 2:
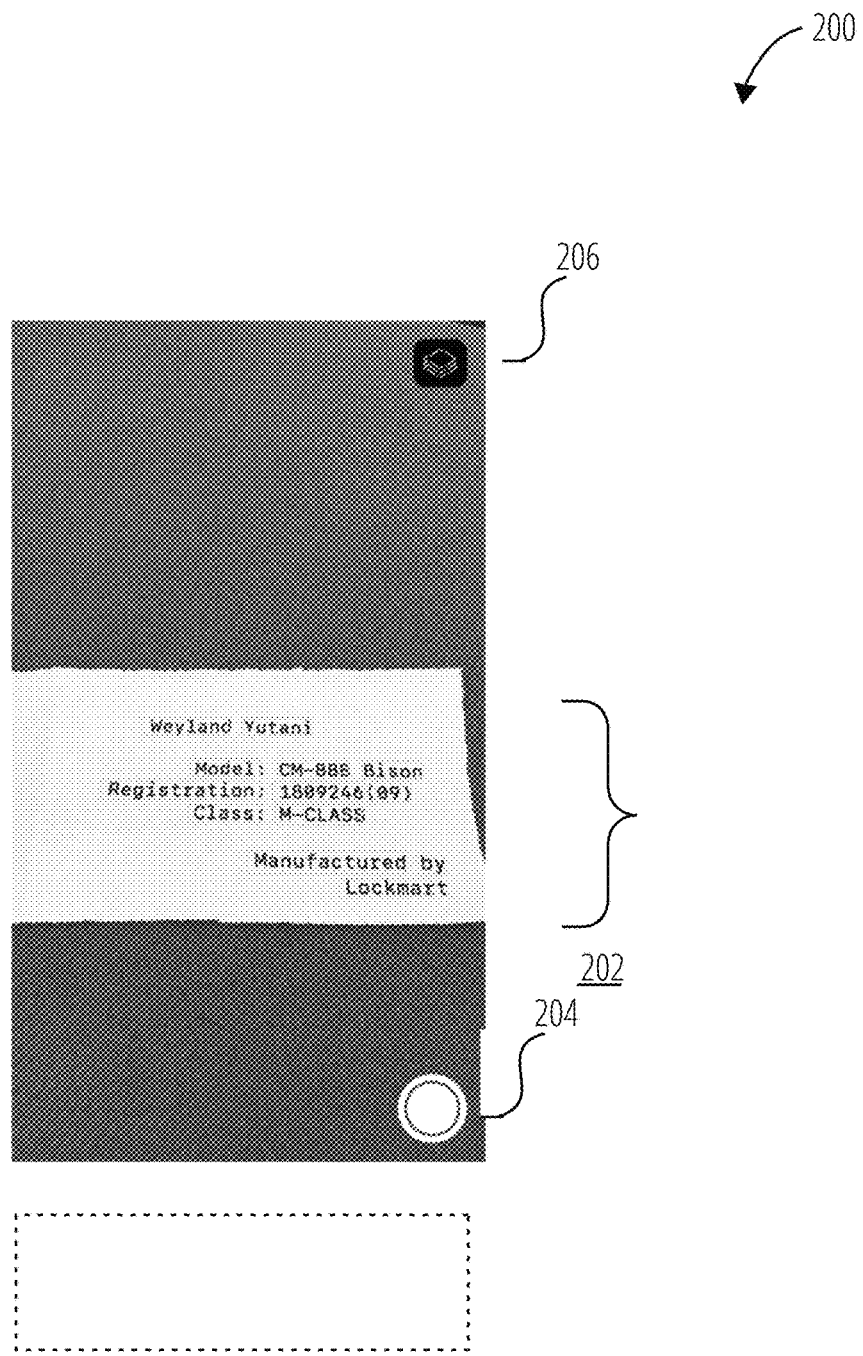
FIG. 2 illustrates information to be included in a form.

FIG. 2 shows an example of Information 202 being captured by the camera to be included in the form. The Information 202 may contain one or more elements of text (herein including numbers) and other non-textual graphics.

Upon clicking the text shutter button 204 optical character recognition (OCR) is performed on the Information 202 in the picture. Any OCR techniques known in the art can be used to analyse the picture. The results of the OCR are then cropped and rotationally corrected to give the clearest view resulting in selectable text on a data entry screen 304 represented in the Information 202. Live character tracking may optionally be enabled using button 206 to give a preview of what is being recognized by the OCR.

Optionally another soft button (not shown) can be added to allow the user wants to take a normal picture without the OCR to include in a field of the form that allows that format.

Figure 3:
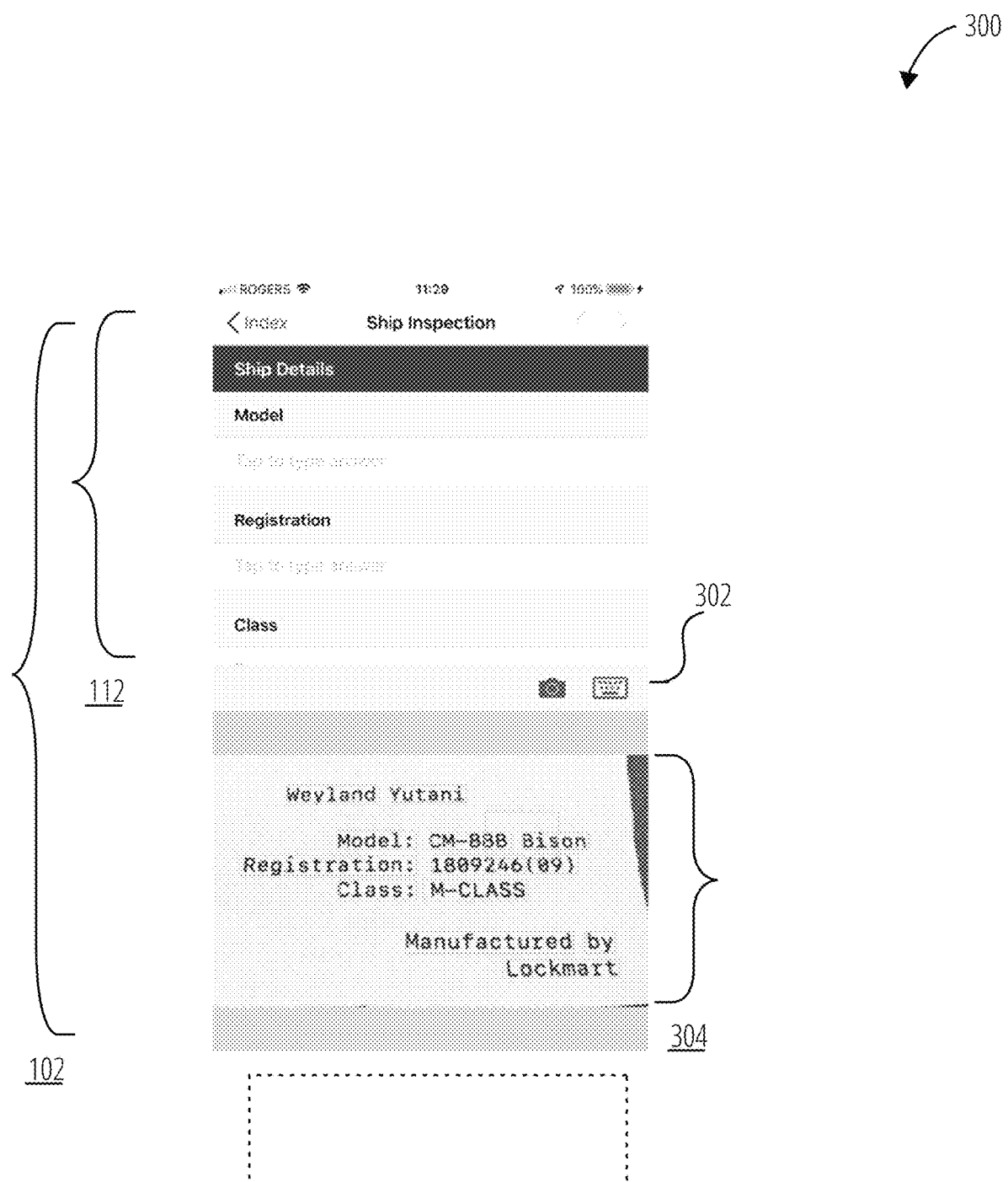
FIG. 3 illustrates an example of a text selection screen

FIG. 3 shows how the selectable text from the OCR is displayed in the data entry screen 304 of the mobile device screen 102. The user can switch back to the camera or the keyboard display using the camera and keyboard selector 302. The user can move between fields while the data entry screen 304 is displayed.

Figure 4:
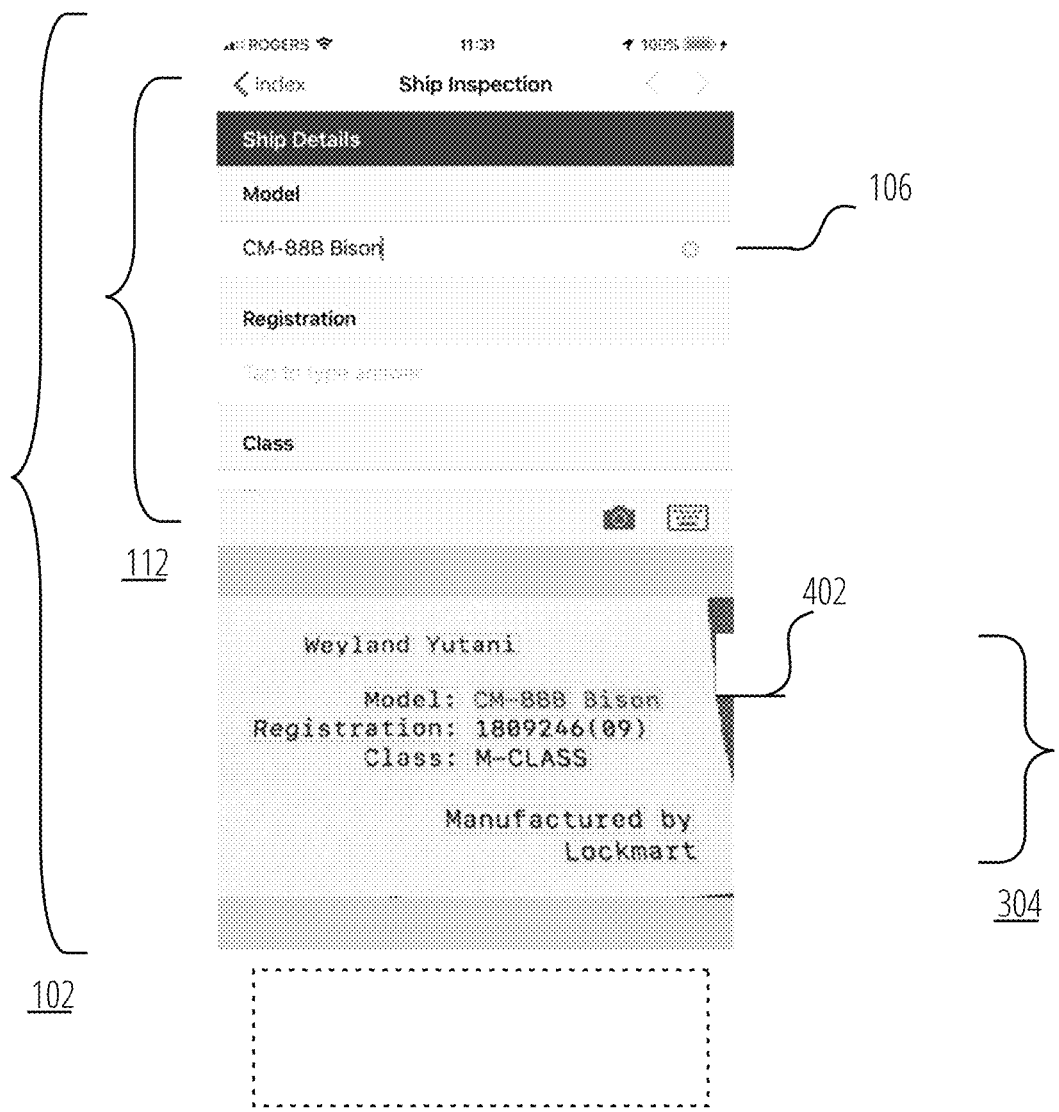
FIG. 4 illustrates an example of a selection of one or more elements

FIG. 4 shows an example of selected one or more elements 402, where the user selected a field 106 and then selected one or more elements 402 which were automatically entered in the field 106. The user can selected modify or remove some or all of the text/numbers in the field 106 just as it was entered using the keyboard.

Figure 5:
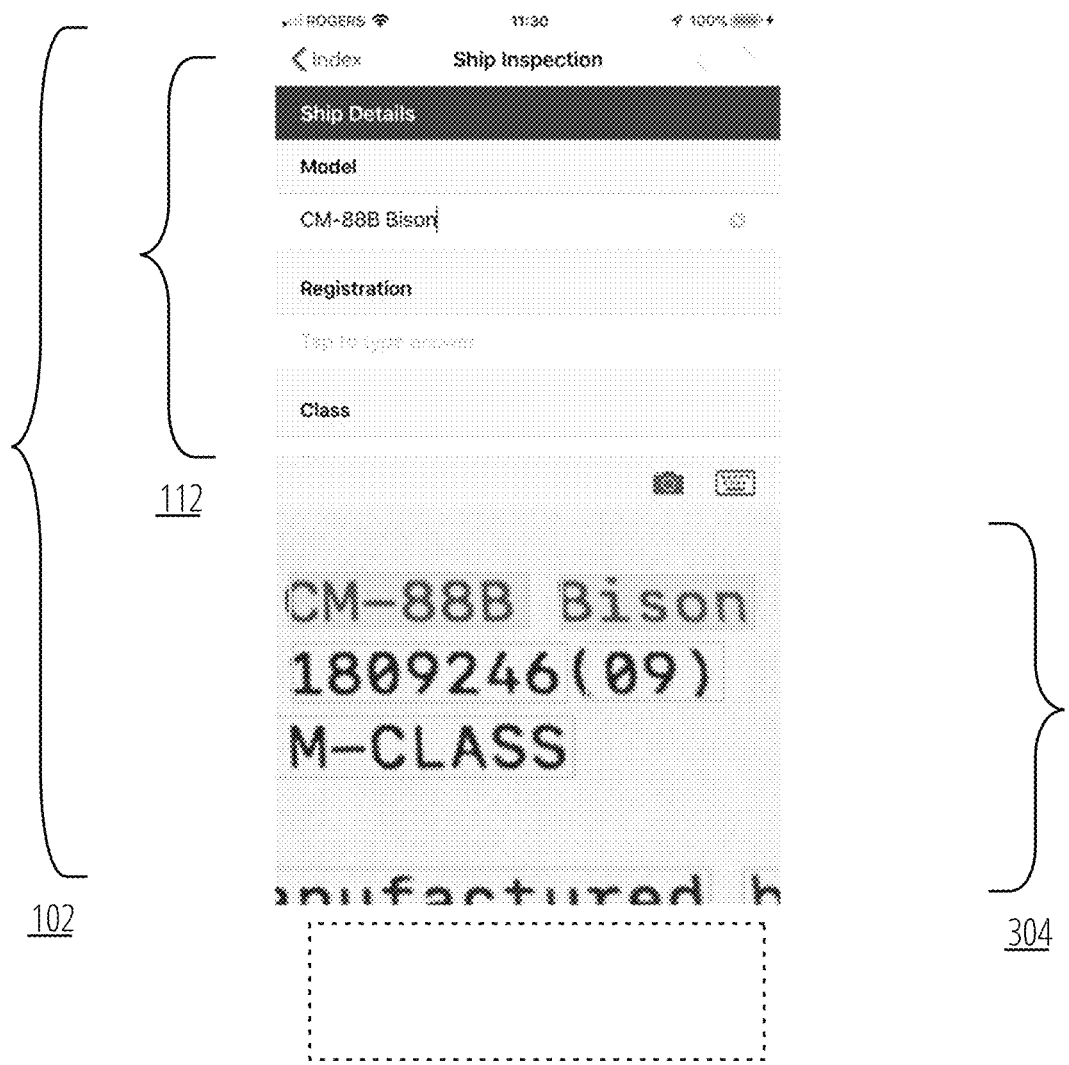
FIG. 5 illustrates an example of zooming on the selectable text

FIG. 5 depicts an example how the user can zoom in the selectable text 304 to help with selecting the required text. The zooming can be achieved using any types of gestures known in the art.

Figure 6:
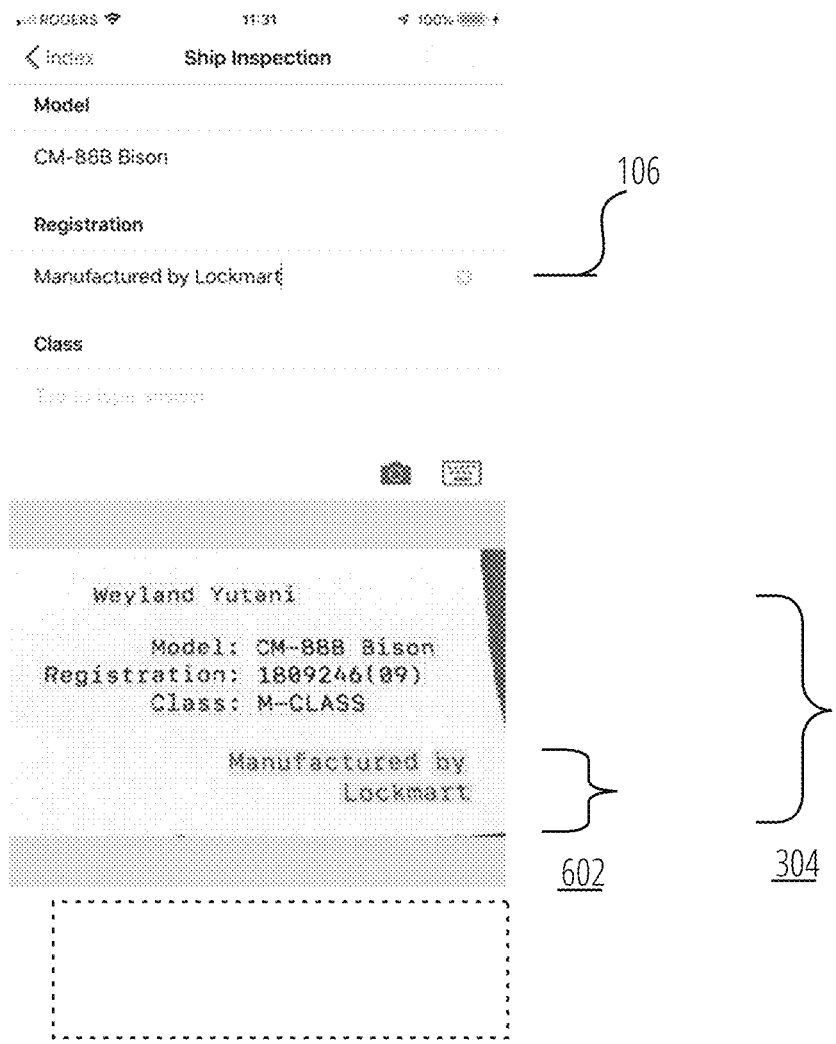
FIG. 6 illustrates an example of a multi-line selection

FIG. 6 shows another example where the user performs a multi-line selection 602. In this case, the system orders the text from left to right, top to bottom and displays as normal text in the field 106. In another embodiment, the selected components may not be collocated, but they can be selected together to fill one field at once.

Figure 7:
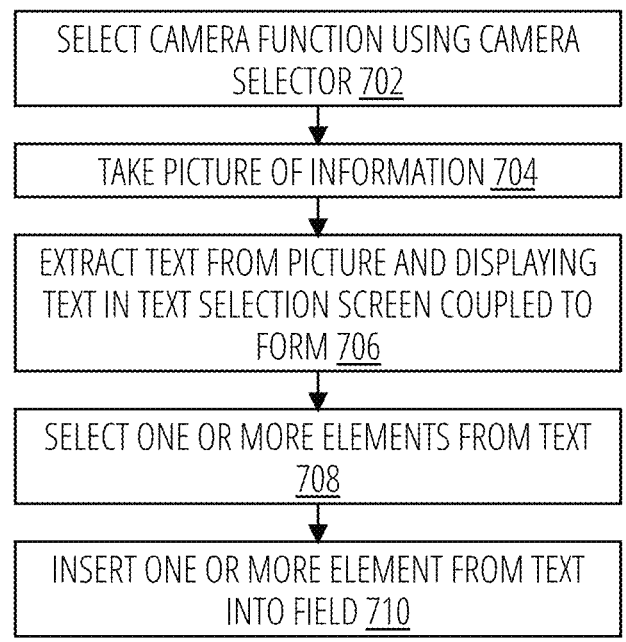
FIG. 7 illustrates an example of a flow chart representing one embodiment.

FIG. 7 summarizes the step of one embodiment of the invention. In block 702, routine 700 selects a camera function using a camera selector. In block 704, routine 700 takes a picture of information. In block 706, routine 700 extracts text from the picture and displaying the text in a text selection screen coupled to the form. In block 708, routine 700 selects one or more elements from the text. In block 710, routine 700 inserts the one or more element from the text into the field.

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method for efficient data entry in a first field of a form displayed on a mobile device screen comprising:
   displaying, on said mobile device screen, at least two sections, wherein a first section displays said form and a second section displays a data entry screen;
   displaying a camera selector for selecting a camera function, in a data recognition mode, from said data entry screen;
   in response to a user taking a picture of information;
   extracting, cropping and rotationally correcting selectable text from said picture and displaying said selectable text in said data entry screen;
   in response to a user selecting one or more elements from said selectable text;
   automatically inserting said one or more elements from said selectable text into said first field.

2. The method of claim 1 wherein when said one or more elements are not collocated, said inserting comprises merging said one or more elements into said first field.

3. The method of claim 1, wherein when said one or more elements are in multiple lines, said inserting comprises merging said one or more elements into said first field.

4. The method of claim 1, further comprising live character tracking to give a preview of the selectable text.

5. The method of claim 1, further comprising displaying a keyboard selector enabling the user to modify the selectable text.

6. The method of claim 1, further comprising displaying a soft button enabling the user to take a picture without extracting selectable text for inserting in a second field of the form.

7. An apparatus comprising:
   a processor; and
   a memory storing instructions that, when executed by the processor, configure the apparatus to:
      display at least two sections on a mobile device screen, wherein a first section is displaying a form and a second section is displaying a data entry screen;
      display a camera selector for selecting a camera function, in a data recognition mode, from said data entry screen;
      in response to a user taking a picture of information;
      extract, crop and rotationally correct selectable text from said picture, and display said selectable text in said data entry screen;
      in response to a user selecting one or more elements from said selectable text;
      automatically insert said one or more elements from said selectable text into a selected first field of the form.

8. The apparatus of claim 7 wherein when said one or more elements are not collocated on the picture, said inserting comprises merging said one or more elements in said first field.

9. The apparatus of claim 7, wherein when said one or more elements are in multiple lines, said inserting comprises merging said one or more elements into said field.

10. The apparatus of claim 7, wherein the instructions further configure the apparatus for character tracking to give a preview of the selectable text.

11. The apparatus of claim 7, wherein the instructions further configure the apparatus to display a keyboard selector enabling the user to modify the selectable text.

12. The apparatus of claim 7, wherein the instructions further configure the apparatus to display a soft button enabling the user to take a picture without extracting selectable text for inserting in a second field of the form.

* * * * *